United States Patent
Ahn et al.

(10) Patent No.: US 7,167,524 B2
(45) Date of Patent: Jan. 23, 2007

(54) METHOD OF INSERTING SYNC DATA IN MODULATED DATA AND RECORDING MEDIUM CONTAINING THE SYNC DATA

(75) Inventors: Seoung Keun Ahn, Seoul (KR); Sang Woon Suh, Seoul (KR); Jin Yong Kim, Kyunggi-do (KR); Kees A. Schouhamer Immink, Geldrop (NL)

(73) Assignee: LG Electronics Inc., Seoul (KR)

( * ) Notice: Subject to any disclaimer, the term of this patent is extended or adjusted under 35 U.S.C. 154(b) by 742 days.

(21) Appl. No.: 10/062,507

(22) Filed: Feb. 5, 2002

(65) Prior Publication Data

US 2002/0136338 A1 Sep. 26, 2002

(30) Foreign Application Priority Data

Mar. 24, 2001 (KR) .............................. 2001-15478

(51) Int. Cl.
*H04B 14/04* (2006.01)
(52) U.S. Cl. ...................................... 375/253
(58) Field of Classification Search ............... 375/253, 375/242, 354, 365, 363, 362, 366, 368, 377; 714/699, 776, 775, 752, 746; 360/131, 135; 369/13.01, 13.02, 13.35, 13.34
See application file for complete search history.

(56) References Cited

U.S. PATENT DOCUMENTS

| 6,112,324 A * | 8/2000 | Howe et al. ................. 714/763 |
| 6,121,902 A * | 9/2000 | Kobayashi .................... 341/58 |
| 6,256,326 B1 * | 7/2001 | Kudo .......................... 370/512 |
| 6,415,398 B1 * | 7/2002 | Kikuchi et al. ............. 714/701 |
| 6,571,361 B1 * | 5/2003 | Kikuchi et al. ............. 714/701 |
| 6,747,977 B1 * | 6/2004 | Smith et al. ........... 370/395.64 |
| 6,757,231 B1 * | 6/2004 | Fujiwara .................. 369/53.35 |
| 6,879,637 B1 * | 4/2005 | Nakagawa et al. ......... 375/253 |

* cited by examiner

*Primary Examiner*—Pankaj Kumar
(74) *Attorney, Agent, or Firm*—Birch, Stewart, Kolasch & Birch, LLP

(57) ABSTRACT

The present invention relates to a method of inserting sync patterns of different lengths in modulated data, and a recording medium having sync patterns produced by the method. The sector sync and the frame sync pattern to be inserted in modulated data in accordance with the present invention must satisfy the given (d,k) constraints, have distinctive 0's run the modulated channel data can not have, and be as short as it can. In addition, the frame sync pattern is shorter than the sector sync pattern because the frame sync pattern is more frequently inserted than the sector one. Owing to the present sync patterns, the storage capacity reduction of a recording medium due to necessary insertion of sync patterns can be minimized under a given modulation condition.

15 Claims, 3 Drawing Sheets

1 Sector = ( 1 Frame Sync + Channel Data ) x 26

Frame sync = 32 bits

*Conventional Art*

1 Sector = ( 1 Sector Sync + Channel Data ) + ( 1 Frame Sync + Channel Data) x 25

Sector Sync : d 0's 1 (k+3) 0's 1 d 0's - - - (k+2d+5 bits)
Frame Sync : d 0's 1 (k+1) 0's 1 d 0's - - - (k+2d+3 bits)

METHOD OF INSERTING SYNC DATA IN MODULATED DATA AND RECORDING MEDIUM CONTAINING THE SYNC DATA

BACKGROUND OF THE INVENTION

1. Field of the Invention

The present invention relates to sync patterns, and more particularly, to a method of inserting sync patterns of different lengths in modulated data and a recording medium having sync patterns produced by said method.

2. Description of the Related Art

Run length limited codes, generically designated as (d, k) codes, have been widely and successfully applied in modern magnetic and optical recording systems. Such codes, and means for implementing such codes are described by K. A. Schouhamer Immink in the book entitled "Codes for Mass Data Storage Systems" (ISBN 90-74249-23-X 1999). Run length limited codes are extensions of earlier non return to zero recording codes, where binary recorded "zeros" are represented by no (magnetic flux) change in the recording medium, while binary "ones" are represented by transitions from one direction of recorded flux to the opposite direction.

A (d, k) code must satisfy the constraints that at least d "zeros" are recorded between consecutive "ones", and no more than k "zeros" are recorded between consecutive "ones". In, for example, a (1, 7) code there is at least one "zero" between "recorded "ones", and there are no more than seven recorded contiguous "zeros" between recorded "ones".

The series of encoded bits is converted, via a modulo-2 integration operation, to a corresponding modulated signal formed by bit cells having a high or low signal value. A "one" bit is represented in the modulated signal by a change from a high to a low signal value or vice versa, and a "zero" bit is represented by the lack of change in the modulated signal.

The EFM (Eight-to-Fourteen Modulation) system used for recording information on a Compact Disk (CD) can be found in U.S. Pat. No. 4,501,000. The EFM-modulated signal is obtained by converting a series of 8-bit information words into a series of 14-bit code words.

In the meantime, the EFM+ system is used for recording information on a lately-developed high-density disk, generically called a DVD. In the EFM+ system, a series of 8-bit information words is converted into a series of 16-bit code words. An operation of a coding device adopting the EFM+ system is described below briefly.

FIG. 1 is a block diagram of a coding device which comprises a data receiver 10 receiving a series of 8-bit information words; an encoder 20 converting the received series of information words into a series of 16-bit code words, namely, channel data under a given (d, k) constraints; and a sync inserter 30 inserting a sync pattern periodically in the channel data.

The sync pattern is used for synchronizing a decoder (not shown) with a reproduced bit trains of channel data in a later reproduction. In a DVD, a sync pattern is inserted every frame, thus, total 416 sync patterns (=26 frames×16 sectors) are inserted in a 32-Kbyte ECC block containing channel data modulated by the EFM+ system, as shown in FIG. 2. The sync data is 32-bit long and has 8 different patterns to distinguish among a sector start, even or odd frame, and so on.

However, even though the sync data is essential to data decoding, it conveys no information. As a result, the insertion of sync data reduces the storage capacity of a recording medium such as DVD.

SUMMARY OF THE INVENTION

It is an object of the present to provide a method of generating sync patterns whose length is as short as it can be under a given (d, k) constraints and whose type is distinguishable at the same time, and of inserting the sync patterns in a series of modulated data.

It is another object of the present invention to provide a recording medium storing modulated data which sync patterns whose length is as short as it can be under a given (d, k) constraints and whose type is distinguishable are inserted in.

A method of inserting sync patterns in modulated data in accordance with the present invention is characterized in that it comprises the steps of: receiving modulated channel data; identifying a frame sequence of each frame-constituting channel data in a sector; and inserting a sync pattern in the channel data, the length of the sync pattern varying based on the identified frame sequence.

A recording medium in accordance with the present invention is characterized in that it contains modulated data comprising sync patterns which are added to every frame-constituting data unit of the modulated data wherein the length of the sync pattern varies based on a frame sequence of a corresponding frame-constituting data unit in a sector.

The present invention may be embodied in other specific forms without departing from the sprit or essential characteristics thereof. The present embodiments are therefore to be considered in all respects as illustrative and not restrictive, the scope of the invention being indicated by the appended claims rather than by the following description and all changes which come within the meaning and range of equivalency of the claims are therefore intended to be embraced therein.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 3 is a simplified block diagram of a coding device which a method of inserting sync patterns in modulated data in accordance with the present invention is embedded in;

DETAILED DESCRIPTION OF THE PREFFERRED EMBODIMENT

In order that the invention may be fully understood, a preferred embodiment thereof will now be described with reference to the accompanying drawings.

Figure 1:
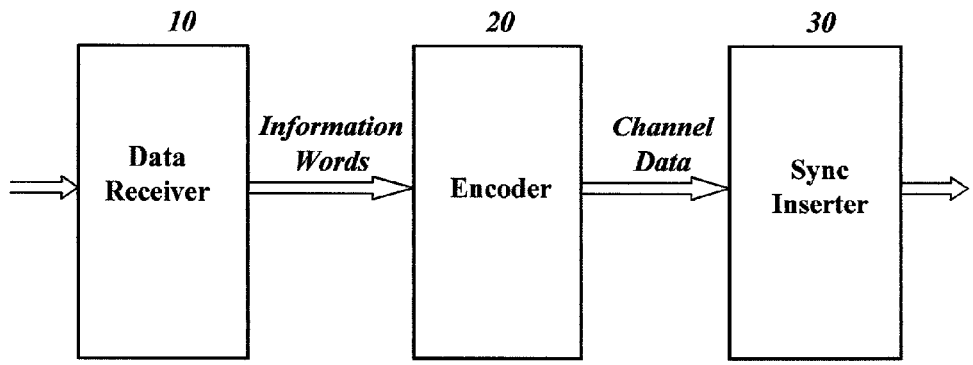
FIG. 1 is a block diagram of a conventional coding device.
Figure 2:
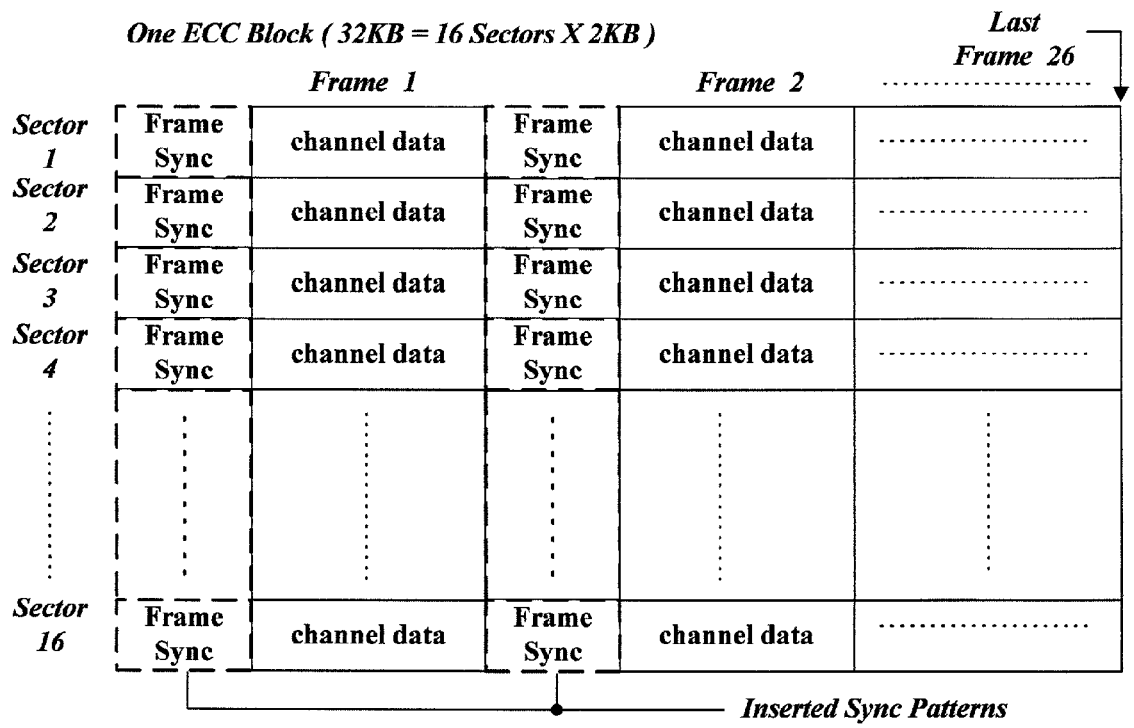
FIG. 2 shows an ECC block in which conventional sync patterns are inserted.
Figure 3:
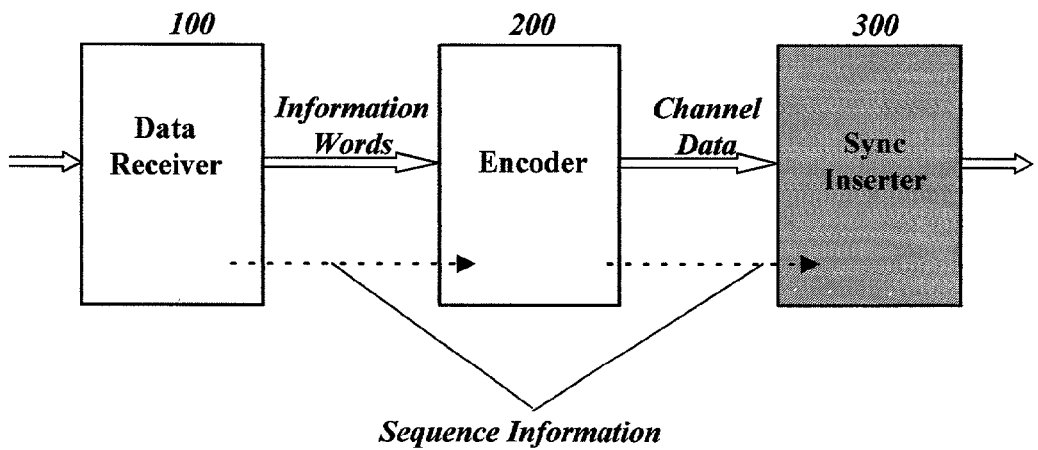

FIG. 3 is a simplified block diagram of a coding device which a method of inserting sync patterns in modulated data in accordance with the present invention is embedded in. The coding device of FIG. 3 comprises a data receiver 100 receiving a series of 8-bit information words; an encoder 200 converting the received series of information words into a series of 16-bit code words, namely, channel data under a given (d, k) constraints; and a sync inserter 300 periodically generating sync patterns in accordance with the present invention and inserting them in the channel data.

The data receiver 100 counts the received information words and delivers the sequence information of each information words to the encoder 200. Then, the encoder 200 also delivers the sequence information of each corresponding coded words to the sync inserter 300.

The sync inserter 300 determines based on the received sequence information whether or not current frame-constituting channel data is the first frame in a sector of an ECC block, and it inserts a sector sync or a frame sync based on the determination where the sector sync and the frame sync have mutually different length. This sync data inserting method is described below in detail.

Figure 4:
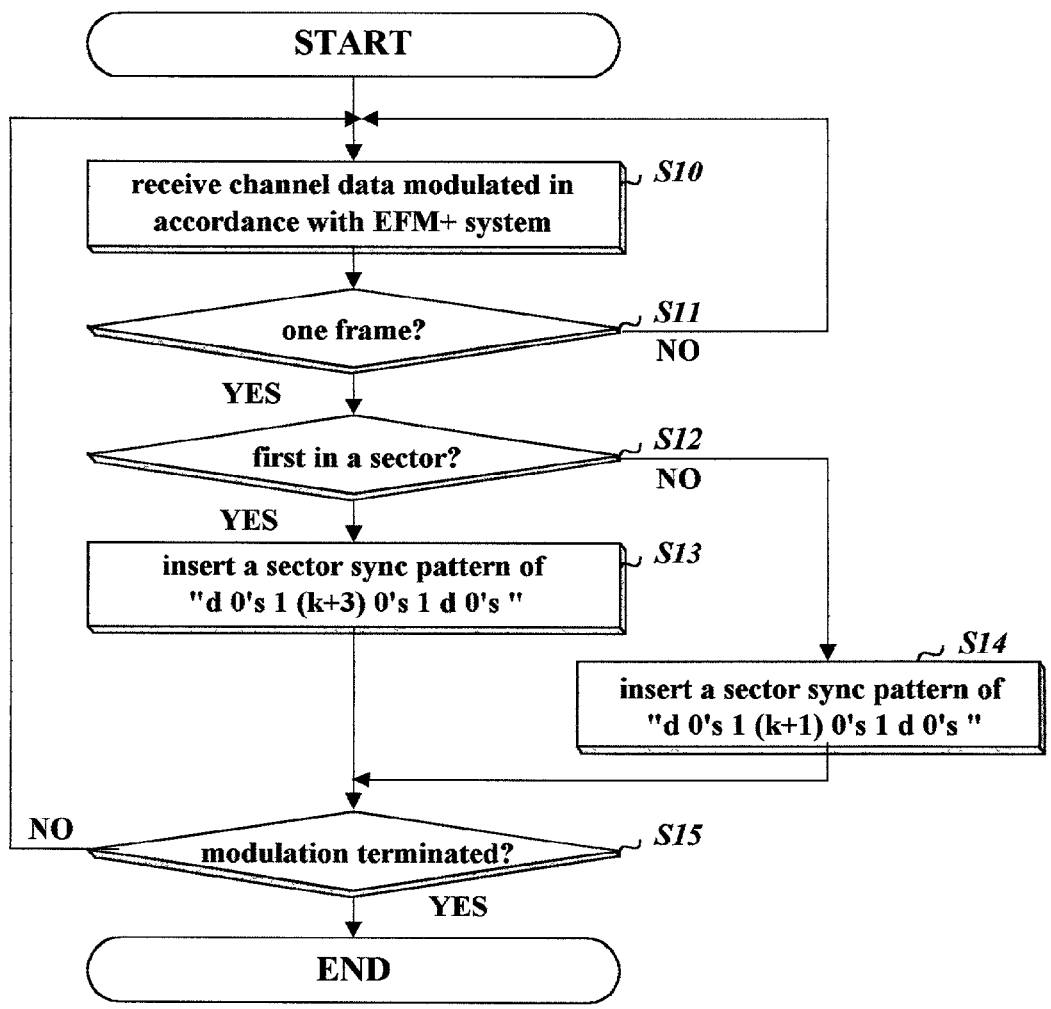
FIG. 4 illustrates a flow chart of an embodiment of a method inserting sync patterns in a series of modulated data in accordance with the present invention.

FIG. 4 illustrates a flow chart of an embodiment of a method inserting sync patterns in a series of modulated data in accordance with the present invention.

The sync inserter 300 receives a series of channel data (S10) which was converted by the encoder 200 according to the EFM+ system under a given code rate m/n and (d, k) constraints. And, the sync inserter 300 checks whether the bit length of the received channel data is equal to a frame length, e.g., 1066 bits (S11), and, if the length of the received bits has reached the frame length, the sync inserter 300 checks, based on the sequence information from the encoder 200, whether or not this frame-constituting channel data is the first frame in a current sector (S12).

If first, the sync inserter 300 generates a sector sync pattern identifying the first frame of a sector and inserts it before the first frame (S13) and, if not first, the sync inserter 300 generates a frame sync pattern of which length is different from, preferably, shorter than that of the sector sync pattern (S14). These pattern inserting operations are conducted repeatedly until the modulation by the EFM+ system is terminated (S15).

The sector sync and the frame sync pattern to be inserted in the modulated data must satisfy the given (d, k) constraints, have distinctive 0's run the channel data can not have, and be as short as it can to minimize the reduction of storage capacity. In addition, the frame sync pattern is preferably shorter than the sector sync pattern because the frame sync pattern is more frequently inserted than the sector one.

To satisfy the above conditions under the given (d, k) constraints, the frame sync and the sector sync pattern generated in accordance with the present invention have bit formats expressed in "d0's 1 (k+1) 0's 1 d0's" and "d0's 1 (k+3) 0's 1 d0's", respectively. These expressions mean that d zeros are placed before the first one, (k+1) or (k+3) zeros between the first and the second one, and d zeros after the second one.

In, for example, a (d, k)=(1, 7) code, the frame sync and the sector sync pattern to be inserted in the modulated channel data become "010000000010" (single '0', '1', eight '0's, '1', single '0') and "01000000000010" (single '0','1', ten '0's, '1', single '0'), respectively.

If the two exemplary sync patterns are used, the total bits of sync patterns in one ECC block are 5,024 (=16×14 (bits of sector sync)+16×25×12 (bits of frame sync)). Instead, using the conventional sync patterns, the total bits of sync patterns are 13,312 (=26×16×32). Thus, the storage capacity is increased by 8,288 (=13,312−5,024) bits, namely, 1,036 bytes per an ECC block.

The 0's run between successive ones in the sector sync data may be (k+2) instead of (k+3). However, the importance of the sector sync data is greater than the frame sync data is because the sector sync pattern is used for servo control, etc., therefore, the 2T difference is given in the 0's run to ensure an enough margin for preventing misinterpretation between the sector sync and the frame one due to severe jitter.

The 0's run between two consecutive ones in the frame pattern and the sector one may be longer than the set values (k+1) and (k+3), respectively. However, even though the 0's run becomes longer, these two sync patterns are determined in obedience to the condition that the frame sync pattern is shorter than the sector sync pattern.

Figure 5:
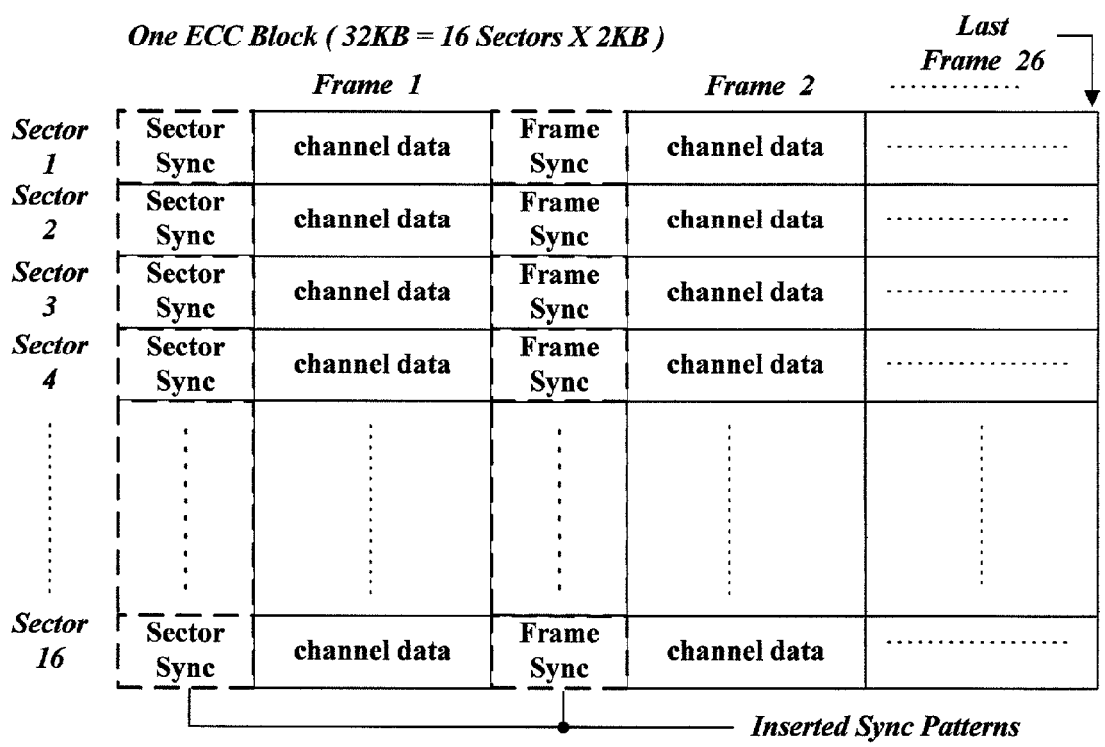
FIG. 5 shows an ECC block in which the sync patterns are inserted in accordance with the present sync data inserting method.

FIG. 5 shows an ECC block in which the two sync patterns are inserted in accordance with the present sync data inserting method. In the illustrative 32-Kbyte ECC block of FIG. 5 containing channel data modulated by the EFM+ system, 16 sector sync patterns have been added at respective heads of 16 sectors and 400 frame sync patterns, whose length is shorter than the sector sync pattern, have been inserted between two neighboring frames.

The sync pattern inserting method and a recording medium containing modulated data in which sync patterns are inserted in accordance with the present invention are capable of minimizing the storage capacity reduction of a recording medium due to necessary insertion of sync patterns under a given modulation condition.

What is claimed is:

1. A method of inserting sync patterns in modulated data in a recording device, comprising:
   (a) receiving modulated channel data;
   (b) identifying a frame sequence of each frame-constituting channel data in a sector; and
   (c) inserting a sync pattern in the channel data, a length of the sync pattern varying based on the identified frame sequence,
   wherein said step (c) inserts a first sync pattern if the identified frame sequence is first in a sector, the first sync pattern being longer in bit length than a second sync pattern which is inserted before or behind non-first frame-constituting channel data.

2. The method of claim 1, wherein the first sync pattern consists of d zeros, one, (k+3) zeros, one, and d zeros when (d,k) constraints are given.

3. The method of claim 1, wherein the second sync pattern consists of d zeros, one, (k+1) zeros, one, and d zeros when (d,k) constraints are given.

4. The method of claim 1, wherein the first sync pattern is longer than the second sync pattern by 2 bits.

5. The method of claim 1, wherein the sync pattern has 0's run longer than k when (d,k) constraints are given.

6. A recording device comprising:
   modulated data in sectors constituting a data block, the modulated data containing sync patterns which are added to every frame-constituting data unit, a length of the sync pattern varying based on a frame sequence of a corresponding frame-constituting data unit in a sector,
   wherein a first sync pattern has been added if the frame sequence is first in a sector, the first sync pattern is longer in bit length than a second sync pattern which has been added before or behind non-first frame-constituting data unit.

7. The recording device of claim 6, wherein the first sync pattern consists of d zeros, one, (k+3) zeros, one, and d zeros when (d,k) constraints are given.

8. The recording device of claim 6, wherein the second sync pattern consists of d zeros, one, (k+1) zeros, one, and d zeros when (d,k) constraints are given.

9. The recording device of claim 6, wherein the first sync pattern is longer than the second sync pattern by 2 bits.

10. The recording device of claim 6, wherein the sync pattern has 0's run longer than k when (d,k) constraints are given.

11. A method of inserting sync patterns in modulated data in a recording device, comprising:
(a) receiving modulated channel data; and
(b) inserting a sync pattern in the channel data at intervals,
wherein a total number of bits inserted for the sync pattern is varied based on whether the sync pattern represents a sector sync pattern or a frame sync pattern,
wherein the total number of bits inserted for the sector sync pattern is longer than the total number of bits inserted for the frame sync pattern, and
wherein the total number of bits inserted for the sector sync pattern is longer than the total number of bits inserted for the frame sync pattern by 2 bits.

12. The method of claim 11, wherein the sector sync pattern consists of d zeros, one, (k+3) zeros, one, and d zeros when (d,k) constraints are given.

13. The method of claim 11, wherein the frame sync pattern consists of d zeros, one, (k+1) zeros, one, and d zeros when (d,k) constraints are given.

14. The method of claim 11, wherein the sector sync pattern and the frame sync pattern have 0's run longer than k, respectively when (d,k) constraints are given.

15. The method of claim 11, wherein the step (b) inserts the frame sync pattern before or behind non-first frame-constituting channel data.

* * * * *